United States Patent

Ribner et al.

[15] 3,637,948

[45] Jan. 25, 1972

[54] CIRCUITS FOR SUPPLYING SUPERVISORY TONES, TUNING SIGNALS, LAMP BLINKING CONTROL AND REDUNDANT CIRCUIT SWITCHOVER FOR AN EPABX

[72] Inventors: Morris Ribner, Chicago; Timothy J. Keough, Woodridge, both of Ill.

[73] Assignee: International Telephone and Telegraph Corporation, New York, N.Y.

[22] Filed: May 13, 1970

[21] Appl. No.: 36,927

[52] U.S. Cl. ....................179/84 R

[51] Int. Cl. ....................H04m 1/26

[58] Field of Search....................179/84 R, 84 A, 90 K

[56] References Cited

UNITED STATES PATENTS 3,223,787 12/1965 Jorgensen ....................179/84 R

*Primary Examiner*—Kathleen H. Claffy
*Assistant Examiner*—William A. Helvestine
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

Integrated circuits are used to generate or form the tone supply for an electronic EPABX. Included are the supply of tones for line supervision and for ringing signal as well as internal DC timing signals. Signal failure detection and redundant circuit switchover are provided in the event of failure.

9 Claims, 14 Drawing Figures

PATENTED JAN 25 1972 3,637,948

SHEET 01 OF 12

Figure 1:
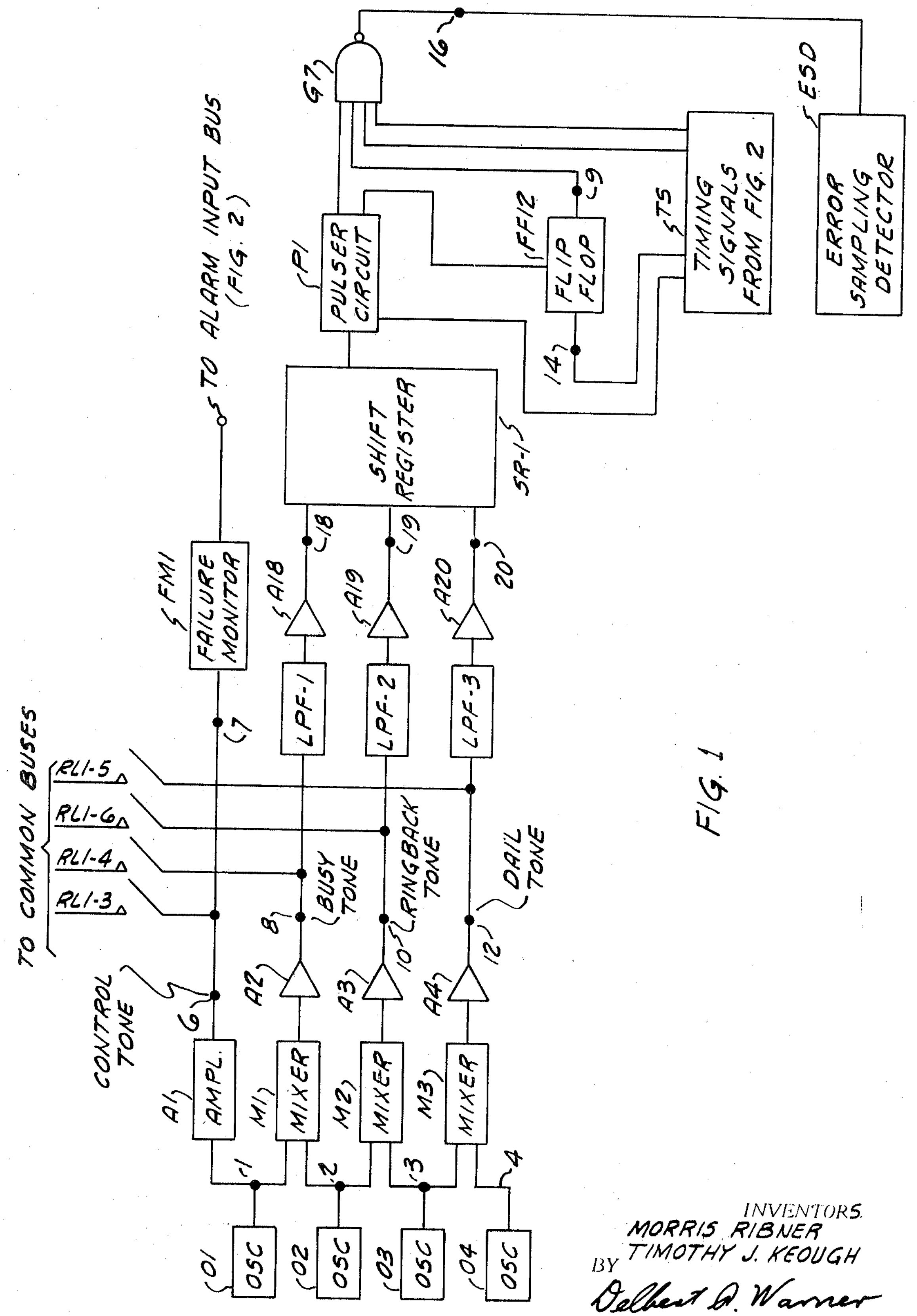

INVENTORS.
MORRIS RIBNER
BY TIMOTHY J. KEOUGH

Delbert A. Warner

ATTORNEY

CIRCUITS FOR SUPPLYING SUPERVISORY TONES, TUNING SIGNALS, LAMP BLINKING CONTROL AND REDUNDANT CIRCUIT SWITCHOVER FOR AN EPABX

The present invention relates to the provision of tone supplies, and particularly to the production of tone signals and timing signals for use in supervision of an electronic switching system, or EPABX. It relates also to checking circuits for determining when there is a failure in the tones or signals and to the provision of switchover means to switch to alternate circuits in case of failure.

Attention is directed to copending applications of Morris Ribner and Alfred M. Hestad which relate to tone signal generators of an earlier form. In particular, attention is directed to an application Ser. No. 852,030 filed on Aug. 21, 1969, in the name of Morris Ribner, entitled "Tone Failure Detector," now U.S. Pat. No. 3,582,577 which is assigned to the same assignee as the present invention. Attention is also directed to another related application filed on Aug. 22, 1969, Ser. No. 852,172, in the names of Morris Ribner and Alfred M. Hestad, entitled "Ringing Tone Distribution Circuits," now U.S. Pat. No. 3,581,020 and assigned to the same assignee as the present invention.

Other prior art arrangements and equipment for providing supervisory tones and timing signals for PABX systems have employed various combinations of electronic and electromechanical systems. The most advanced of these have employed discrete transistor elements. None of these prior art systems have combined traits of speed, compactness, economy, efficiency and the like to the extent needed today with electronic PABX's, or EPABX's.

It is an object of the present invention to provide an improved tone supply for use in EPABX systems.

It is a further object of the invention to provide tone supplies of reduced size and increased efficiency for use in EPABX systems.

It is yet another object of the invention to provide improved means for supplying timing signals, lamp blinking control signals and redundant circuit switchover for an electronic EPABX.

It is an additional object of the invention to provide an accurate means of determining failure of signals employed by embodiments of the invention.

It is yet a further object of the invention to provide quick-acting means for switching over to auxiliary equipment in case of failure in the primary tone circuit or the failure of other signals in the system.

In order to accomplish the foregoing objects and others ancillary thereto, the tone supply for an electronic PABX according to the present invention is supplied in conformance with the Bell System specifications for EPABX systems and its operation is designed to meet those specifications. Embodiments are composed primarily of integrated circuits, which provide both digital and analog functions, but include a number of discrete transistors and relays. Particular functions of the invention are to provide the three mixed, low-level, tones used in line supervision as well as a 620 Hz. control tone and a low-frequency, high-voltage ringing signal. Besides these, other functions envolve the provision of lamp blinking control and other internally used DC timing signals, signal failure detection and redundant circuit switchover in the event of failure. A single Tones Supply may be supplied for the entire EPABX system, or a redundant, standby unit may be provided along with a primary or regular unit.

The novel features that we consider to be characteristic of our invention are set forth with particularity in the appended claims.

Figure 2:
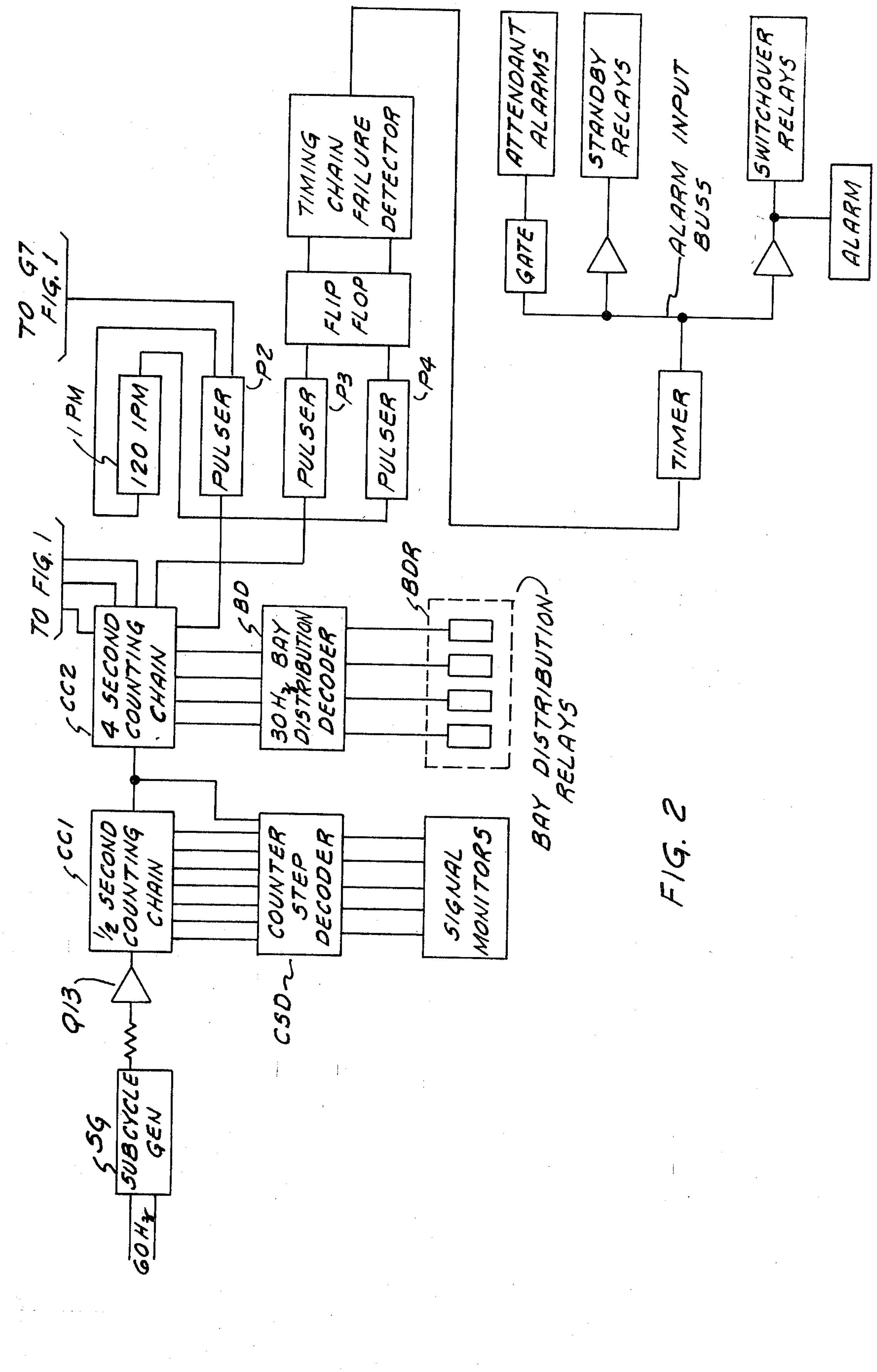
Figure 3:
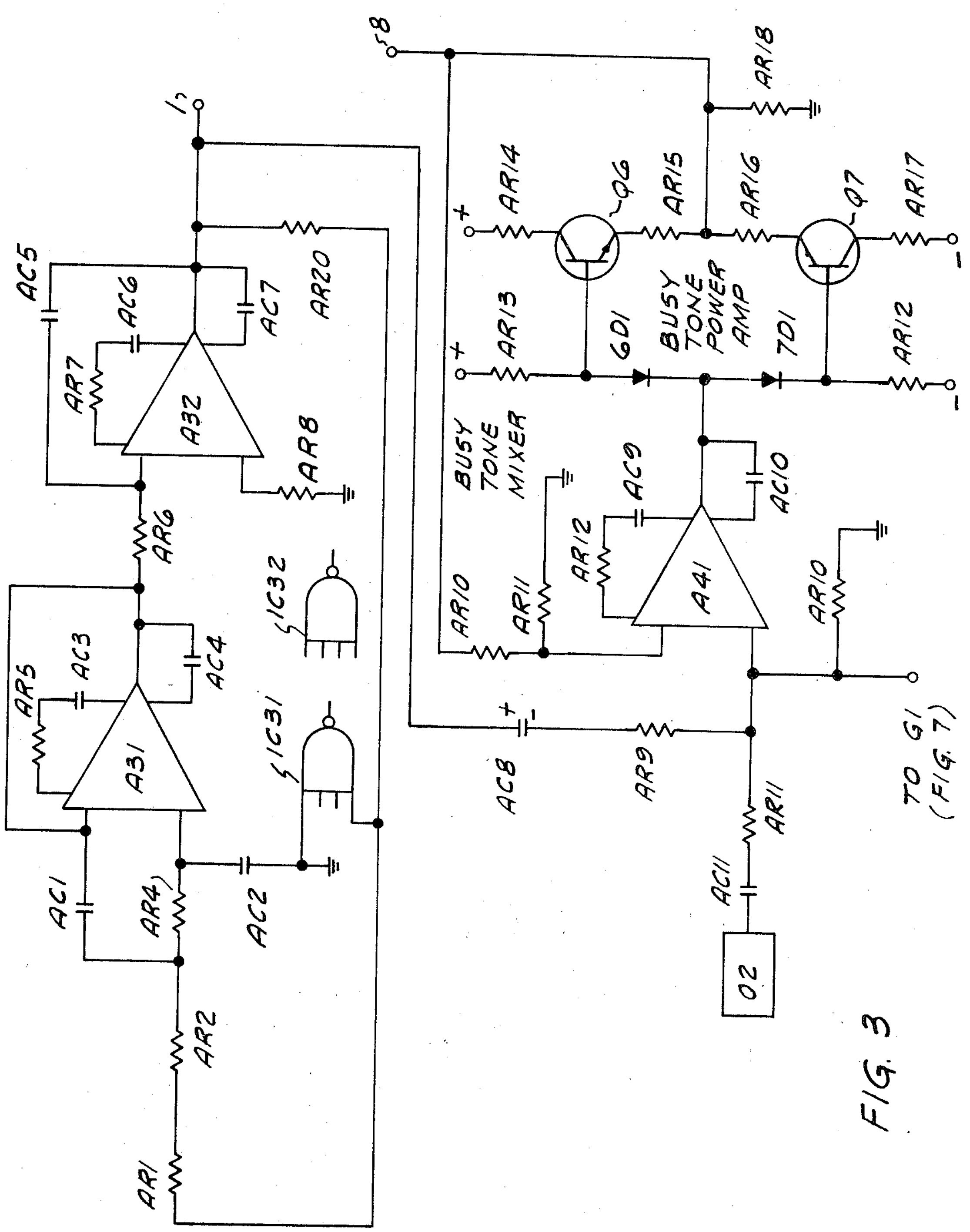
Figure 4:
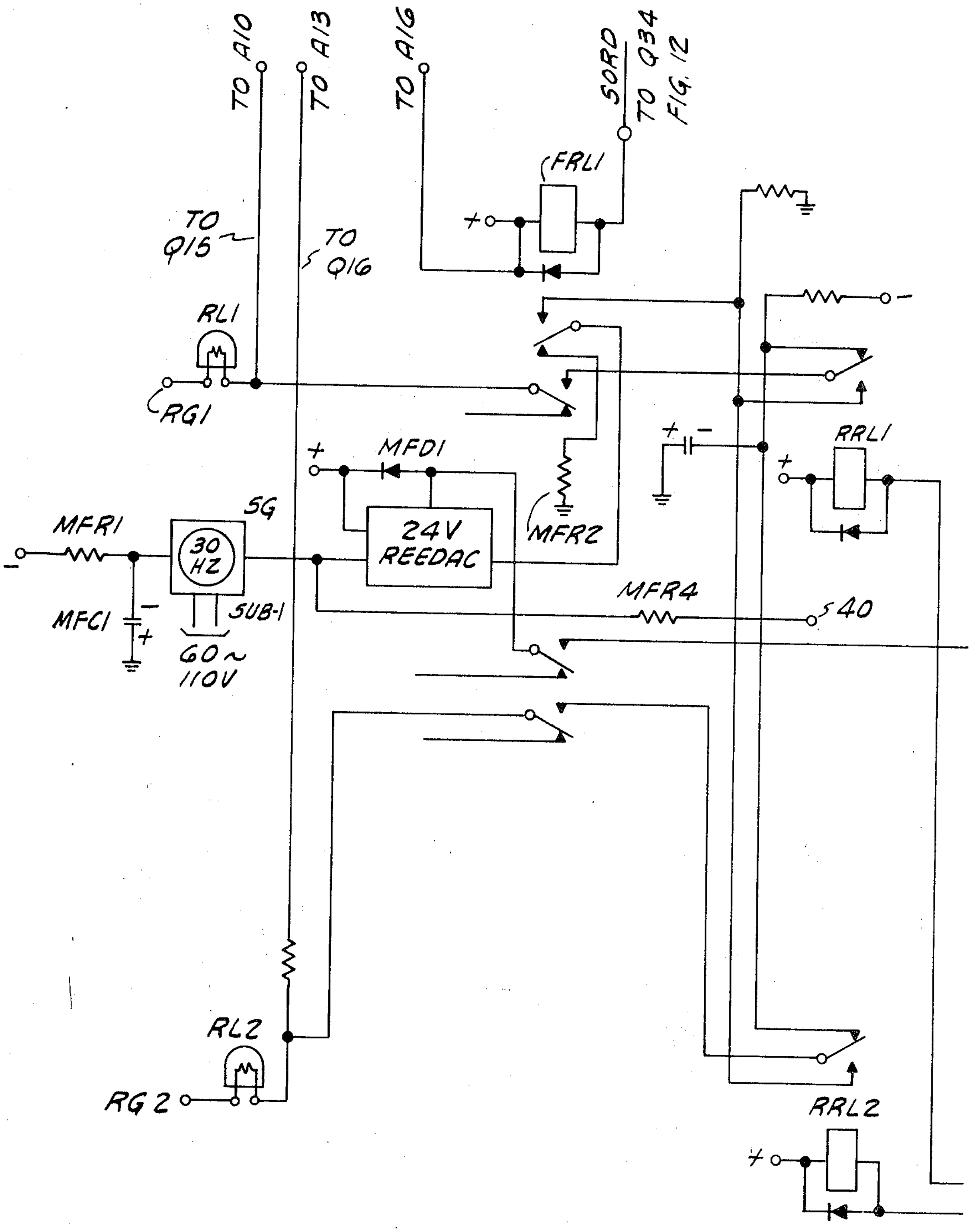
Figure 5:
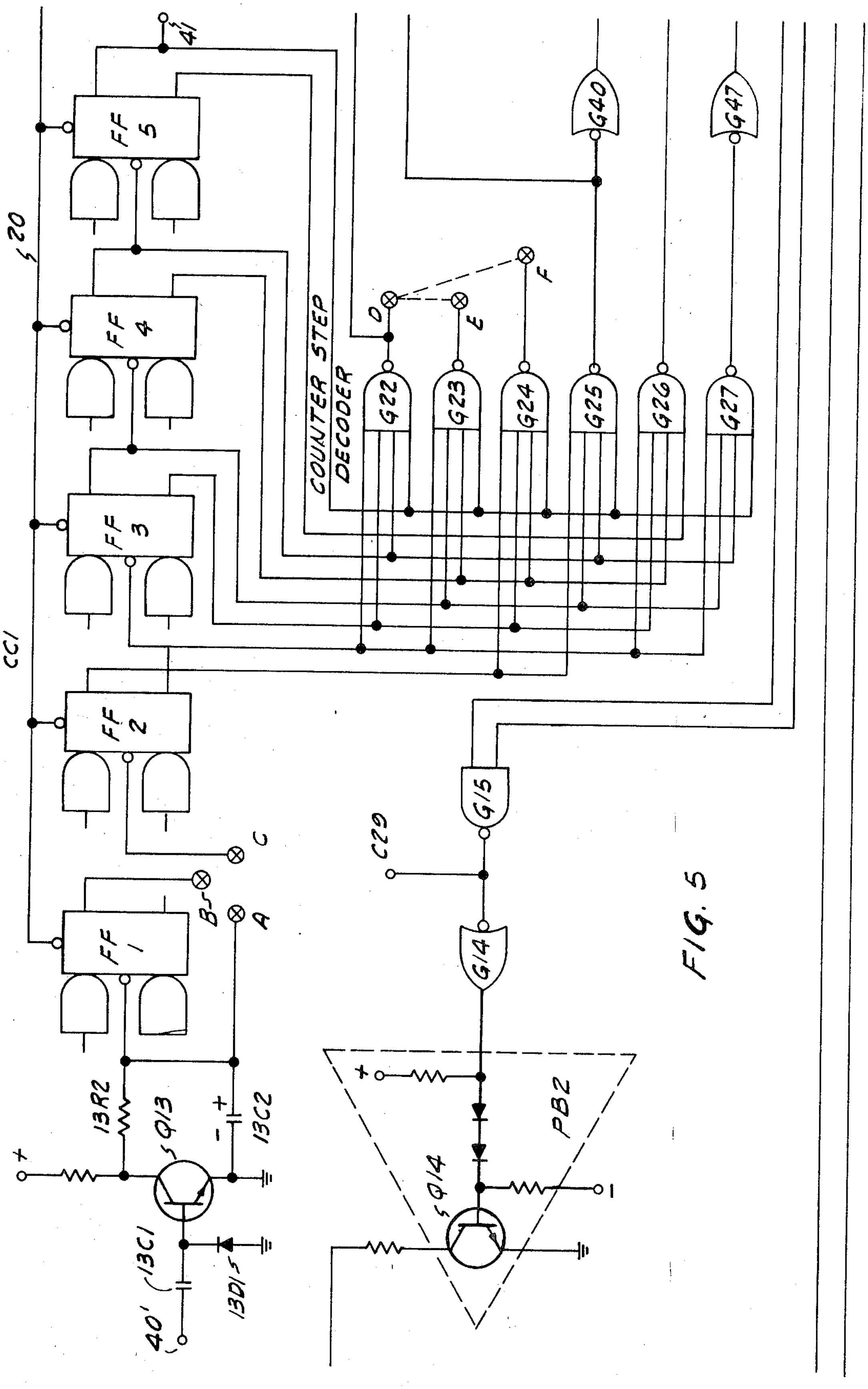
Figure 6:
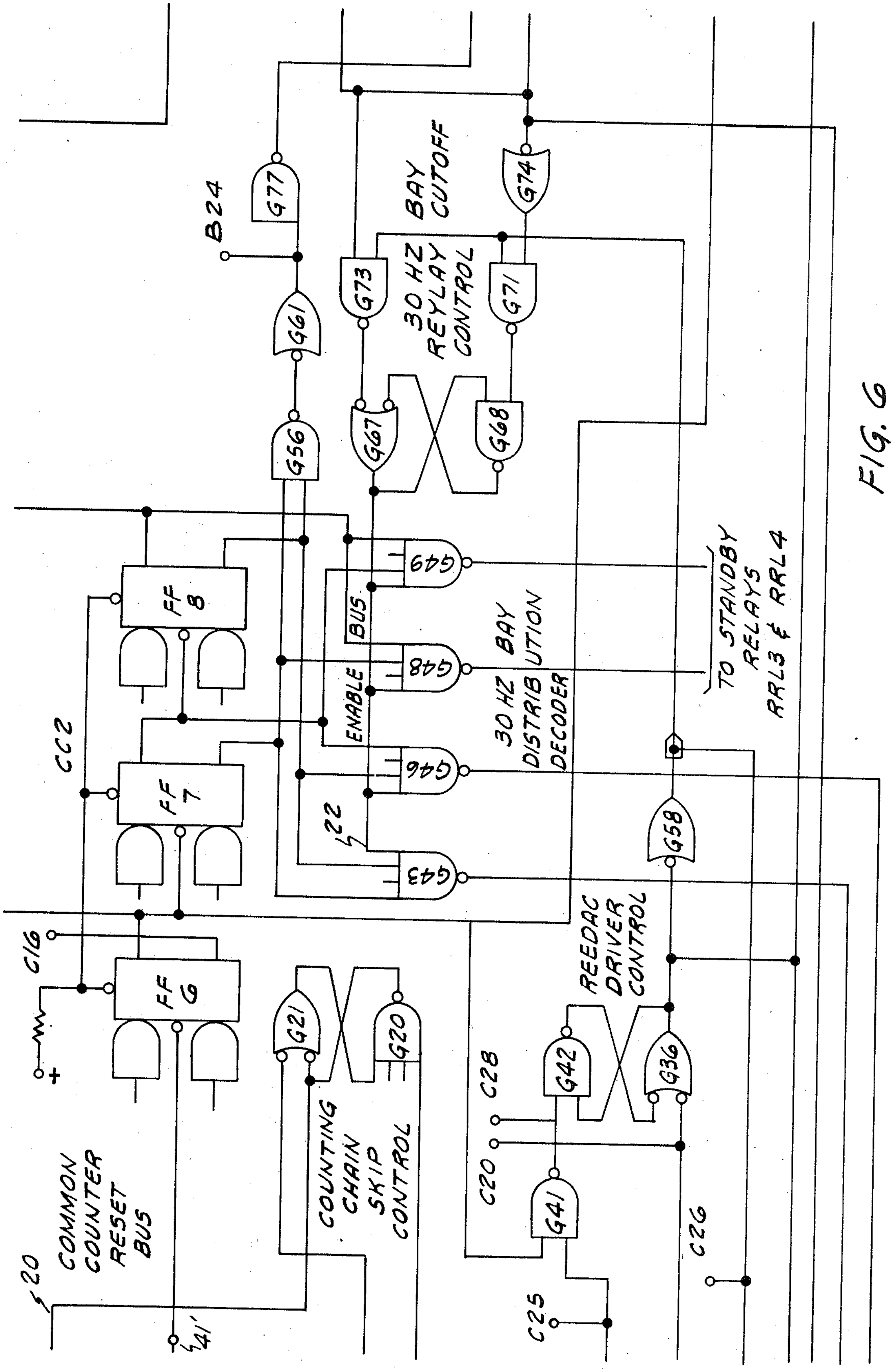
Figure 7:
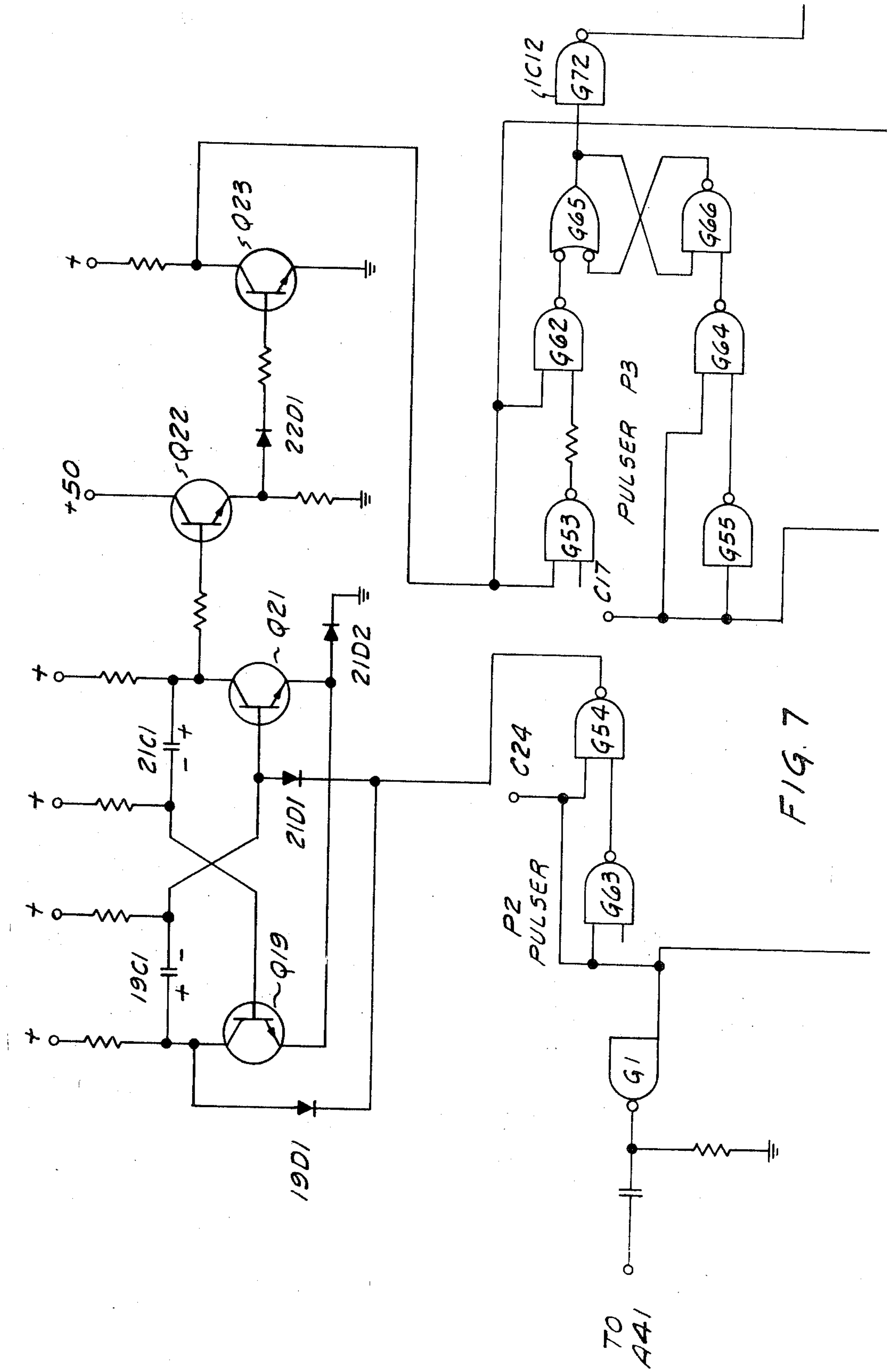
Figure 8:
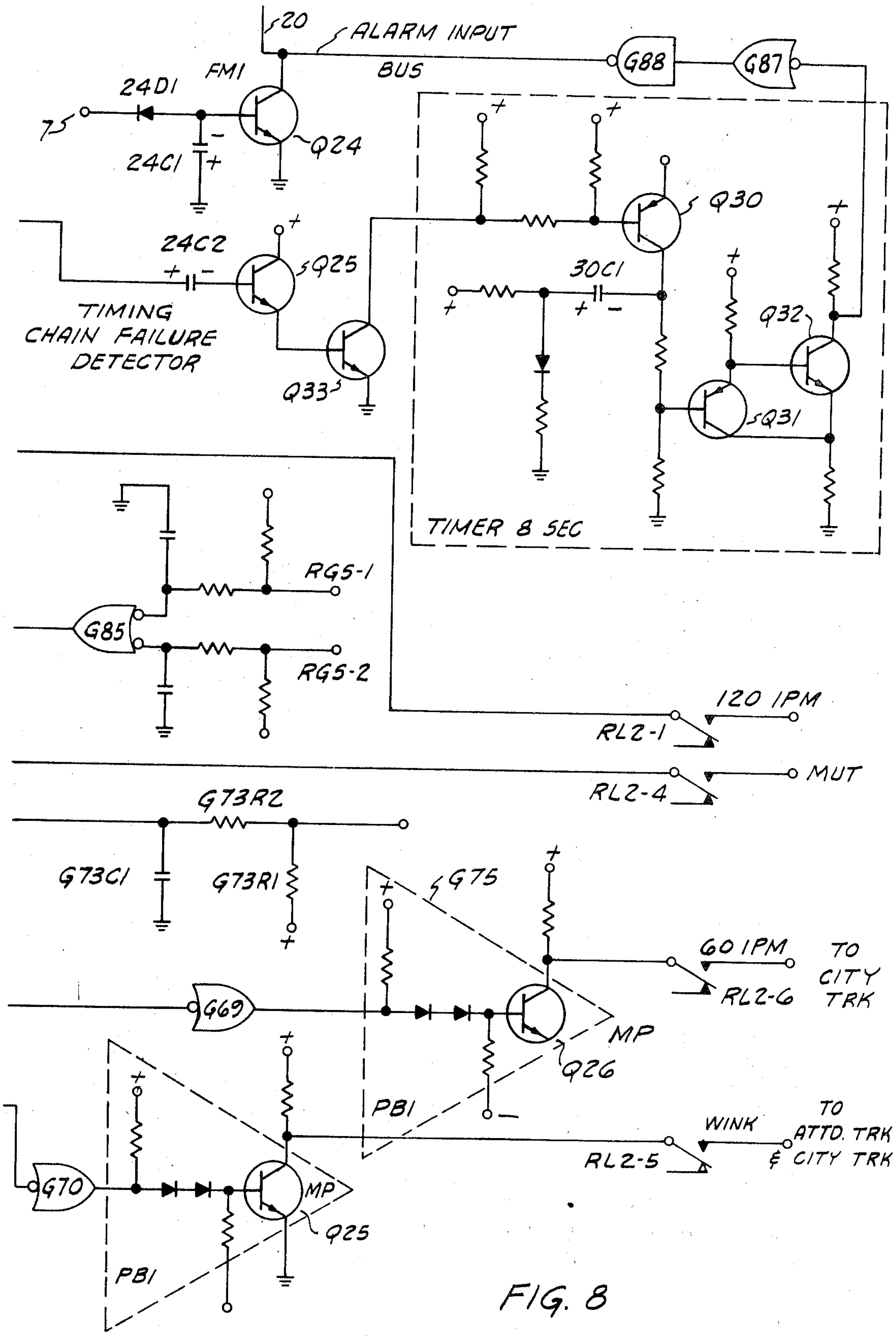
Figure 9:
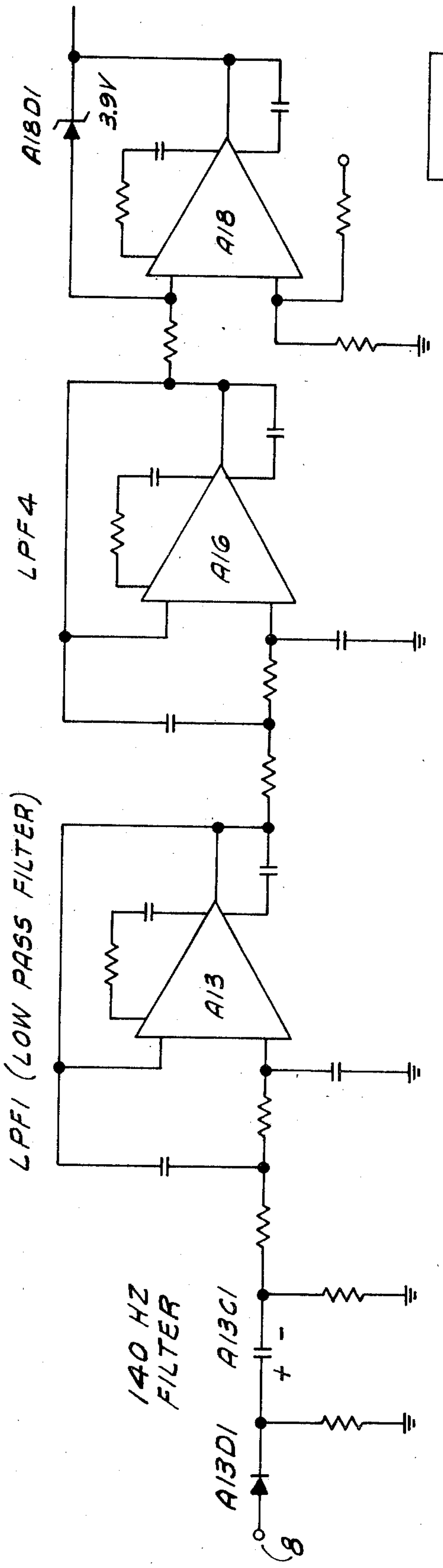
Figure 9B:
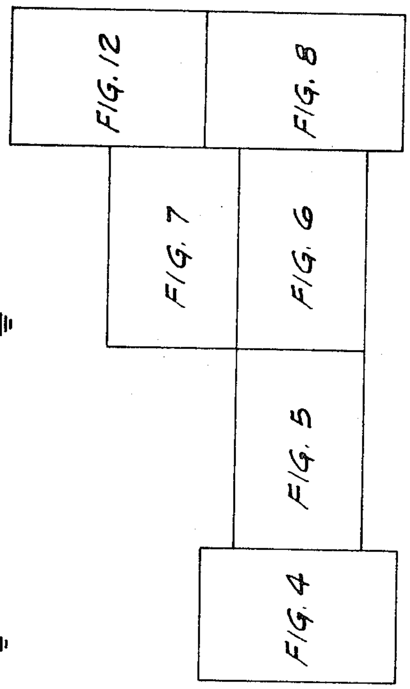
Figure 9A:
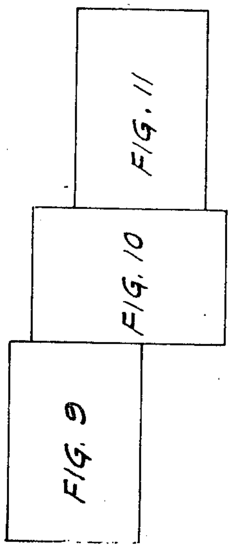
Figure 10:
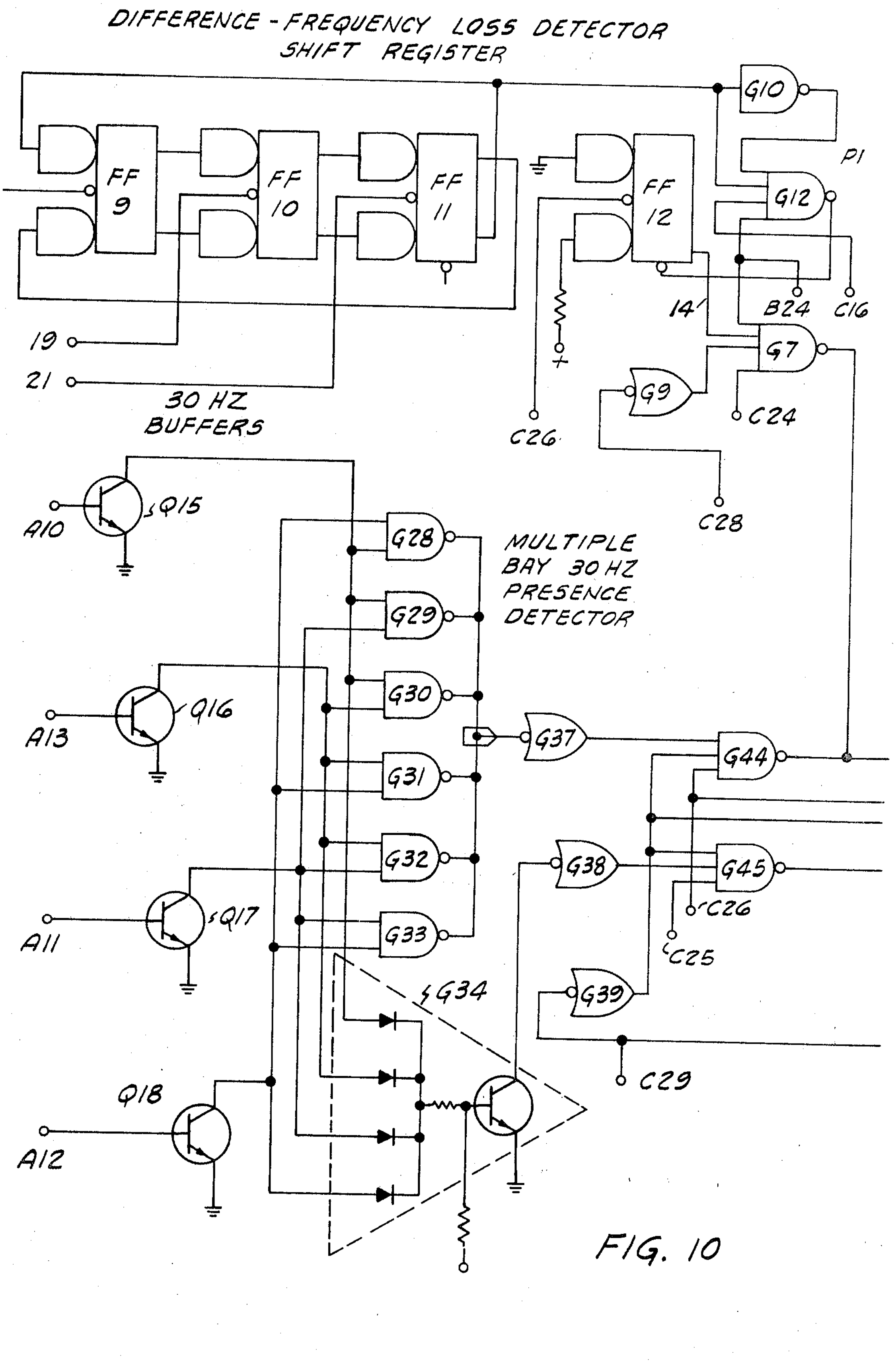
Figure 11:
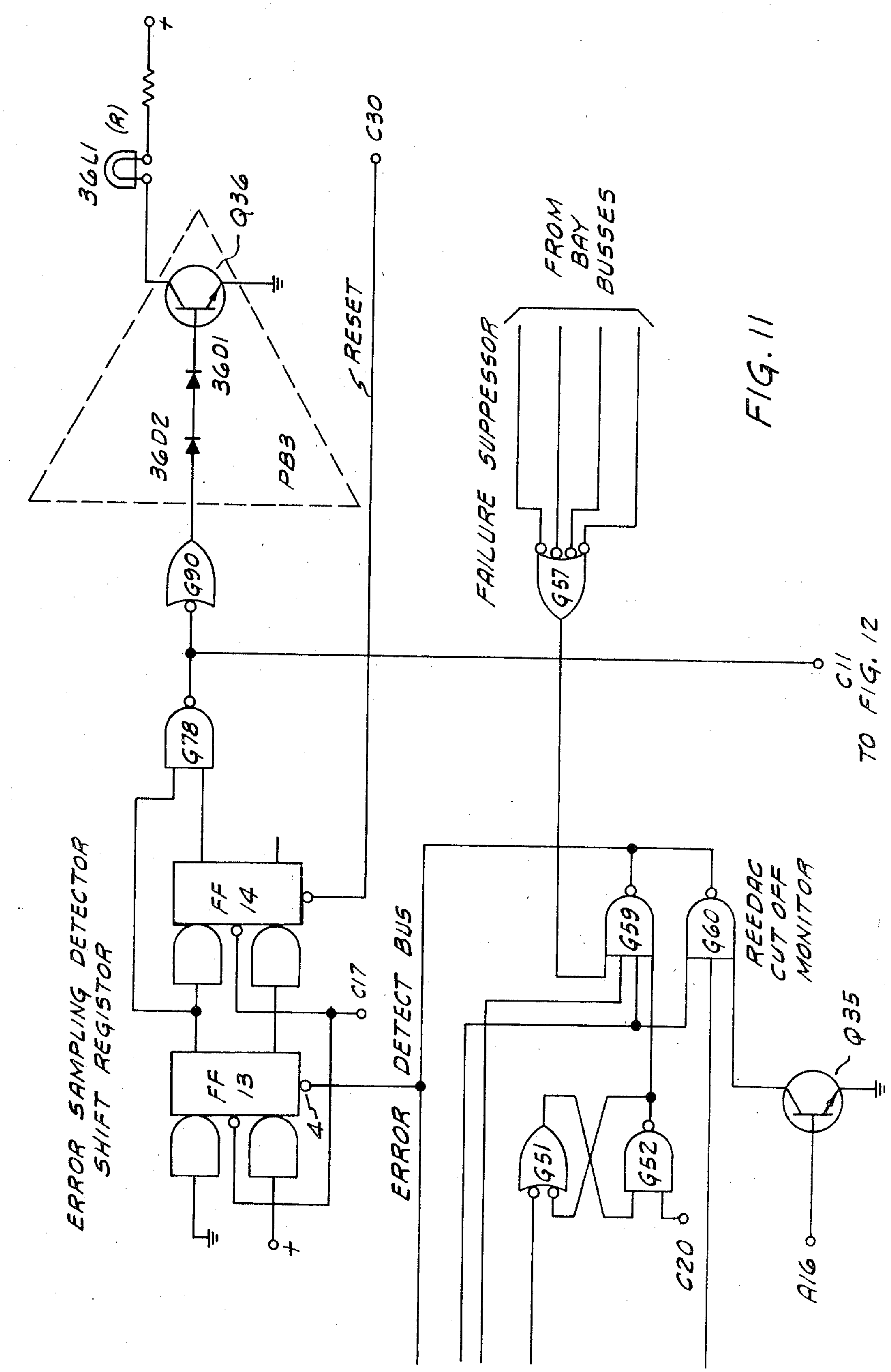
Figure 12:
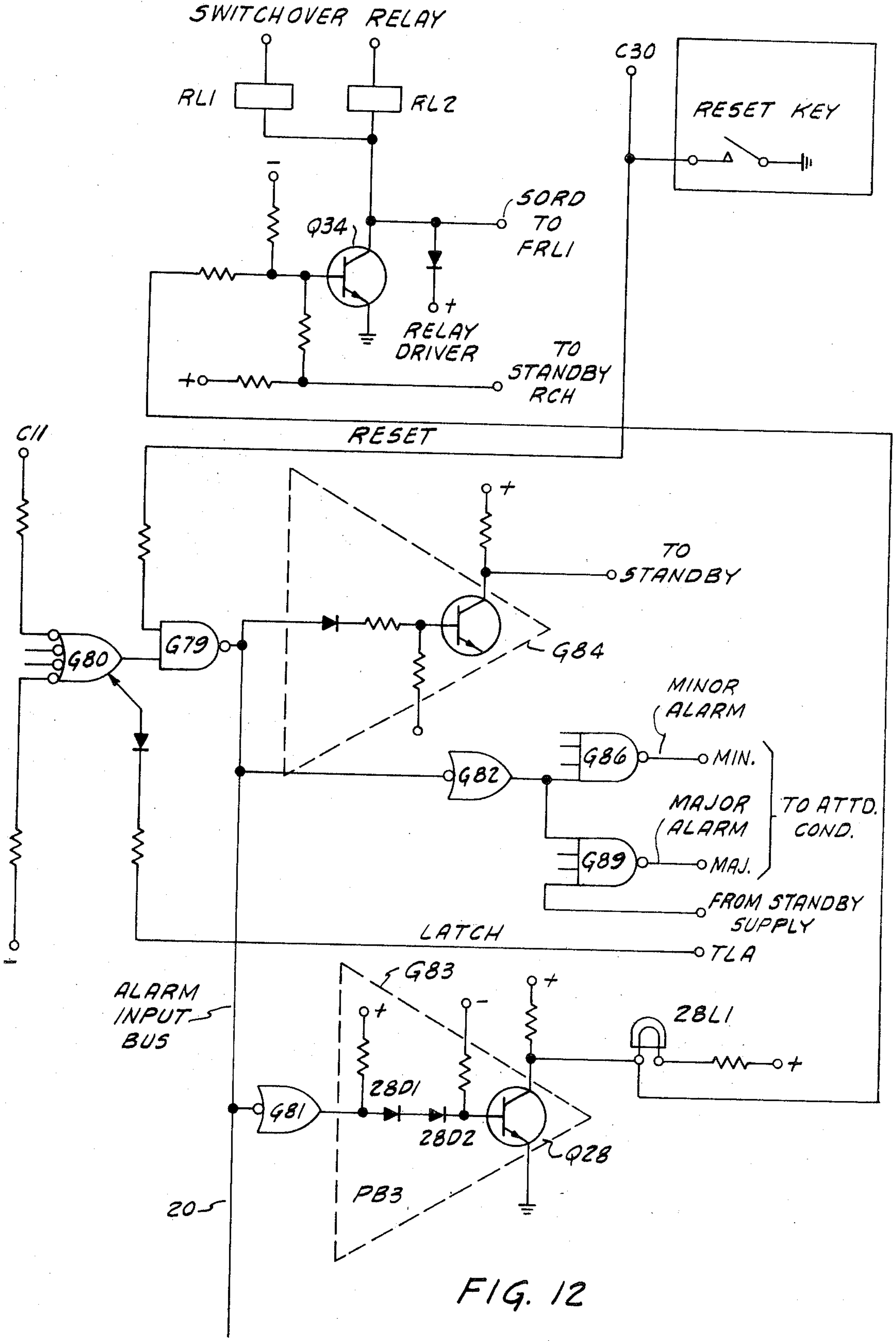

The invention itself, however, both as to its organization and its method of operation, together with additional objects and advantages thereof, will best be understood from the following description of specific embodiments when read in connection with the accompanying drawings, in which:

FIGS. 1 and 2 are block diagrams illustrating the overall arrangement of an embodiment of the invention, FIG. 3 illustrates the interrelationships between an oscillator circuit, a mixing circuit and a power amplifier of use in the practice of the invention, FIG. 4 is a diagram showing the source for low-frequency signals of use in the invention as well as a number of the controls used and associated signaling devices, FIG. 5 shows a block diagram of a ½-second counting chain and associated decoder, FIG. 6 is a block diagram illustrating a 4-second counting chain with additional decoders and related control elements, FIG. 7 illustrates an impulse generating circuit together with pulser circuits feeding into and out of the impulse generating circuit, FIG. 8 is a schematic diagram illustrating the manner in which various signals are routed, FIG. 9 shows the use and connections for various filter components used with the system, FIGS. 9*a* and 9*b* show, by block diagrams, how certain figures can be positioned relative to each other for ready reference, FIG. 10 shows various signal presence and signal loss detecting circuits, FIG. 11 shows error sampling detectors, failure suppressors and cutoff monitors of use with the invention, and FIG. 12 shows relationships between certain sources of alarm signals and various responsive devices and connections.

Turning to the block diagram shown in FIG. 1, four oscillators are represented by the blocks 01, 02, 03 and 04. The outputs of these oscillators are generally selected to be 620, 480, 440 and 350 Hz., respectively, in accordance with standards of the industry. The oscillators are essentially identical, except for differences required to cause them to oscillate at different frequencies. The output of each of these oscillators is applied over a terminal 1, 2, 3 or 4 to an amplifier A1, or a mixer M1, M2 or M3, as shown. The amplifier A1 provides a control tone at 620 Hz. to line 6. The mixers are coupled by amplifiers A2, A3, A4 providing busy tone, ringback tone and dial tone to lines 8, 10 and 12, respectively. From the lines 6, 8, 10 and 12 the tones are supplied to relay contacts RL1–3, RL1–4, RL1–6, RL1–5 and from them to common buses for circuit use. The control tone is applied over a terminal 7 to a failure monitor FM1. The other tones are applied through low-pass filters LPF–1; LPF–2, and LPRF–3 and amplifiers A18, A19, A20 to the shift register SR–1.

The Failure Monitor FM1 (shown in detail in FIG. 8) is a circuit which senses the presence of the control tone (usually 620 Hz.) from amplifier A1. For so long as this tone persists, FM1 remains inactive. If the tone is lost for a certain period, determined in a particular instance as that time required for a capacitor to lose a large percentage of its charge, then FM1 will be activated to transmit a signal to the Alarm Input Bus (in FIG. 2) and operate visible indicators and switches over means to bring standby equipment into use. If the loss of control tone persists for a long enough time, a standby relay will provide a latching voltage so that switchover will become permanent.

The shift register SR–1 embodies three stages of flip-flop circuits (shown in detail in FIG. 10) coupled so that an output from each of the amplifiers A18, A19 and A20 is applied to an input of only one of the three stages. The outputs of A18, A19 and A20 act as clock pulses to each of the associated register stages. In order for any of the shift register outputs to change in response to the clock pulses, the logic levels at the corresponding inputs of the first two flip-flops, which are the driving signal leads, must be different at each clock pulse. If no change occurs at the inputs of the first two flip-flops, no output change will occur when the clock pulse occurs. The three register stages are connected in a manner such that "true" output signals cannot simultaneously exist at all three of their inputs. This is done by crisscrossing the outputs of the last register to inputs of the first register while the others are fed directly. Thus, as long as clock pulses are being supplied to the three stages, repeated transitions will occur at the last stage at the rate of about 40 per second after having been shifted through the first two stages. Since the clock pulses for each of the stages is dependent on the existence of the difference-frequency for each of the supervisory tones, failure of any one will cause termination of the cycling of the built-in transition of the shift registers and none may subsequently occur at the last stage.

A pulser circuit is provided at P1 which feeds into an AND gate at G7 (see FIG. 10 for detailed circuit). The pulser P1 detects the occurrence of the normal positive-going transition from the shift register and also is sensitive to signals occurring during the first half-second period that Ringback tone and Busy tone occur simultaneously. When normal operation prevails, a flip-flop, FF12, will be set at the beginning of each repetition of a cyclically recurring half-second signal at a terminal 14 from timing signals indicated at TS, which are derived from other components of the invention. The setting of FF12 removes a normally existing 1 from its terminal 9 and applies a 0 to one of the inputs of the AND-gate G7. During the second half-second of the period of the simultaneous existence of Busy and Ringback tones, additional inputs are applied to AND-gate G7 so that, during this second half-second, all of the remaining inputs would be 1 simultaneously. Thus, had a failure in the tones occurred during the first half-second, the flip-flop would not have been set and its output would have remained 1. Therefore, during the second half-second G7 would have produced a 0 output indicating an error. This 0 output would have been applied to the Error Detect Bus 16 and to an Error Sampling Detector ESD.

Turn now to the block diagram in FIG. 2 for a brief discussion of other aspects of the invention such as the manner of producing various other signals including ring voltage and timing signals. FIG. 2 shows, as well, means for detecting errors in the various signals and the loss of such signals and includes means for switching to standby or auxiliary equipment.

In FIG. 2 the primary timing signals for the system are from the voltage on 60 Hz. mains. This voltage is applied to a subcycle generator shown as block SG. A subcycle generator can be selected to provide an output at 20, 30, 40 Hz., depending on specific system requirements. Most frequently the signal produced is at 30 Hz. and the embodiment of the invention illustrated in the following employs such a 30 Hz. signal.

The 30 Hz. signal from SG is applied through an amplifier Q13 to a one-half second counting chain CC1 which provides a signal every half-second to the 4-second counting chain CC2. The one-half second counting chain also applies a plurality of outputs to a counter step decoder CSD. The counter step decoder incorporates a plurality of AND gates which provide a number of timing signals. A number of these timing signals are supplied to signal using equipment, as indicated in a general way by the Signal Monitors block and as shown in specific detail in other figures.

The 4-second counting chain CC2 is responsive to outputs from CC1 to generate four sequential 1-second timing signals in a 4-second cycle. These signals are applied to the 30 Hz. Bay Distribution Decoder BD which provides a control signal of 1-second duration over a 4-second cycle in turn to each of four Bay Distribution Relays. These relays activate a maximum of four switching bays for a 400 line switching system. If fewer bays are in use, provision is made for the generation of proportionately fewer signals and, of course, the system will require fewer bay distribution relays.

The 4-second counting chain also provides clock signals to control a pulser P2, a pulser P3 and a 120 impulse per minute astable multivibrator represented by block IPM. Clock pulses from the astable multivibrator are used to control a pulser P4.

As shown in FIG. 2, the pulses P3 and P4 are connected via a flip-flop to a timing chain failure detector. These pulses supply signals to the timing failure detector which, in turn, regulates a timer to provide a signal to the alarm input line in the event of failure of the signals from the pulser for a period exceeding 8 seconds. The timer in turn supplies signals over the alarm input bus to operate an attendant's alarm and standby and switchover relays.

It will be noted in FIG. 2 that a number of connections are indicated to FIG. 1. The signals supplied over these connections to FIG. 1 control elements are represented only partially by the blocks in FIG. 1. The exact connections, the nature of the signals and the elements involved are explained in detail in the following more detailed discussion of the invention.

TONE SOURCES

As indicated previously, four oscillators 01, 02, 03 and 04 are employed for producing the individual tones used in the production of the mixed signalling and supervision tones according to the present invention. The oscillators are identical types for each of the tone frequencies used. An exemplary oscillator is shown in FIG. 3. Each of the oscillator units is composed of two cascaded integrated circuit operational amplifiers such as A31 and A32 and their associated frequency selection input circuits. The second amplifier A32, in the example shown, acts as input also for the first in a feedback loop. All frequency-controlling capacitors are standardized to one value. These are used in RC filter networks tailored for operation at each frequency. The individual frequencies required are 620, 480, 440 and 350 Hz. provided in this case by oscillators 01, 02, 03 and 04, respectively.

In a typical oscillator, the first of the two operational amplifiers (A31) used is fed at its inverting input from a low-pass RC filter. This filter is designed such that a 90° phase lag exists between its output and input at the desired oscillation frequency from the two RC sections which comprise the filter. The capacitor of the first L-section is connected to the amplifier output instead of the usual ground. The amplifier is wired as a unity-gain device in order to minimize distortion and retain stability. Associated compensating networks are provided to eliminate parasitic oscillations. The phase shift across the filter and, consequently the oscillator frequency, over the bandwidth of interest, is controlled by the value of a single resistor in the resistor branch of the first L-section.

The second operational amplifier (A32) is fed directly from the first and is connected as a controlled-gain integrator and designated as a Quadrature Amplifier. It produces a 90° phase lead at any frequency of interest. Since the first amplifier output produces a 90° phase lag, the combination of the two devices results in 0° phase shift in the overall feedback loop and a specified voltage gain at the desired frequency, both of which are essential for oscillation.

The circuit gain is controlled by the second amplifier only and its value is the ratio of the feedback capacitor impedance at the oscillation frequency divided by the source impedance of the second amplifier. As the frequency at which each of these amplifiers is required to operate is different, the feedback capacitor impedance changes and, the gain with it. A compensating change must, therefore, be made in the source impedance to maintain equal loop gains in the oscillator circuit as the frequency changes. Overall loop gain is set to be slightly larger than unity to minimize distortion and prevent oscillation extinction with component tolerance variations under operating condition changes.

Maximum level limiting is also provided to improve amplitude stability. This is done in the feedback path by a circuit which is composed of a series resistor and a shunting pair of Zener diodes. The Zener diodes are derived from two of the inputs of a DTL Extender IC pack IC31, used because of the relative breakdown voltage uniformity between the two diodes. This permits symmetrical clipping of the feedback signal and allows for minimum distortion. Because of signal interaction possible between the IC substrate, if more than one oscillator were to use the same Extender package, separate IC packages I31 and IC32 are used for each of the oscillators.

MIXERS

Outputs from pairs of oscillators 01, 02, 03 and 04 needed for producing the various tones are combined in a linear RC network at one of the inputs to mixing buffer amplifiers of the type shown in FIG. 3. The input used is the noninverting one, since chopping of the signals is required for certain of the tone combinations. If chopping were done at the inverting amplifier input, a simple shunting circuit would be unsatisfactory since, as the shunt impedance is reduced by the chopper G1 (FIG. 7) thereby reducing the source resistance value, the amplifier gain would be increased, and tend to defeat the effect of the chopping action. Mixed-signal gain is controlled by providing feedback across the entire output loop and connecting to the Mixer Amplifier inverting input. A significant loss in signal level is deliberately incurred at the Mixer inputs in order to avoid crosstalk distortion between tone pairs. The loss is counteracted by providing equal gain in the Mixer amplifier.

CHOPPERS

The chopper, where used, is one of the gates of a 944 DTL. The lead to the Mixer inverting input is connected to the output of the 944 through a capacitor. When the input to the 944 becomes a 1, the gate output transistor is saturated, reducing the level of the signal to the Mixer. No DC bias is applied to the 944 output to avoid DC level shifts which would result in clicks when the tones were being chopped. The Choppers are driven from their respective timing sources, located in the control circuit. The Busy Tone Chopper is driven with a 60 IPS square wave from the second counting chain CC2.

POWER AMPLIFIER

The power amplification for the mixed, as well as the single 620 Hz., tones is performed by means of push-pull, complementary, Class B amplifier transistors such as Q6 and Q7 having a very low crossover distortion characteristic as well as minimal quiescent current drain. The threshold conduction level of the transistors is overcome by applying nearly exactly equal minimal biasing voltages over AR13 and AR12 to the two transistor inputs from two slightly forward biased diodes 6D1, 7D1 placed across the base-emitter junctions of the series-connected transistors. Thus, either one or the other of the transistors begins to conduct more current than the quiescent level for the least change in applied signal voltage. Distortion is low, also, because of the relatively large signal level magnitude existing which approximates 15 volts peak to peak. Short-circuit protection to the power transistors is supplied by emitter and collector resistors. A direct ground on the output bias has minimal effect because the output DC voltage level normally approximates 0 volts.

LOAD CONNECTION AND ISOLATION

Load levels as low as 90 ohms may be handled with no difficulty with regards to distortion or amplitude change. The load is directly coupled to the output via relay contacts. A 1K bleeder AR18 at the output bus is provided as a quiescent load, to reduce the already small relative change in amplitude between minimum and maximum load outputs. Each output is interrupted by the contacts of a relay, RL1, which permit connection of the Tone Supply to the overall system supply busses only if all functions of the Tone Supply are proper. This relay forms part of the Switchover Relay group, RL1, RL2 (FIG. 12) and FRL1 (FIG. 4).

RING VOLTAGE

Ringing Voltage is derived from the 60 Hz. mains which supplies a static Subcycle (subcycle) voltage generator as shown in FIG. 4. One such generator is required for systems up to 400 lines, exclusive of redundancy requirements. The voltage continuously generated by the subcycle is applied successively in bursts of 1-second duration, every 4 seconds, to each of the 100-line bays in such a 400-line system. The voltage rotation to the bays is controlled by means of mercury-wetted relays, of which only one is closed at any time.

To reduce contact erosion of these relays, the voltage applied to a relay from the Subcycle generator is removed momentarily from the relay contact input immediately prior to the instant when the relays are rotated (i.e., one is deenergized and another is energized at approximately the same instant). This is done by means of the interposition of a unit, composed of SCR devices and designated by the name "Reedac," between the Subcycle and its load. The Reedac is programmed to cut off the output from the Subcycle generator just prior to the relay switching time and maintain cutoff until somewhat after the relays have assumed their new states. The cutoff period approximates 0.1 second. Relay and Reedac operation is controlled by signals derived from circuitry contained in the control portion of the Tone Supply.

Under normal operating conditions, Ring Voltage is not supplied unless a specific request has been made for it. This request takes the form of a ground signal on one or both of the RGS leads (RGS–1, RGS–2 in FIG. 8) to the Tone Supply, at G85, and is provided, in common, from the various Trunks and Junctors of the system when processing a call to another subscriber.

VOLTAGE OUTPUT ISOLATION

Ring Voltage is supplied to system bay busses through the contacts of the isolating FRL1 relay, forming one relay of the Switchover group. This relay has form C contacts so that the system busses may be connected either to a Regular or Standby Tone Supply, depending on the state of the relay.

TIMING SIGNALS AND CONTROL CIRCUITS

Timing Signals are supplied as indicated in the block diagram of FIG. 2 and in detail in other figures. Timing signals are supplied from timing chain elements to the various circuits which require them. The fundamental timing signal is the 60 Hz. mains frequency, as operated on by the Subcycle generator SG (FIG. 4). The 30 Hz. signal, designated as the "clock" signal, is applied to the first of two separate, cascaded, counting chains composed of JK flip-flops, the natural counting total of the first (CC1—FIG. 5) of which is 16. By means of external circuitry, the count is shortened to 15 which provides an accurate ½-second interval. The second counting chain, (CC2—FIG. 6) which has both a natural and operating count of 8, receives the output of the first one and produces a 4-second, square-wave signal from its output. Determinations are made of some of the states of all 7 of these counterstages, as needed, to obtain sequenced pulses for various functions.

The 30 Hz. clock signal from the Subcycle generator SG is applied over terminal 40—40′ to a buffer amplifier, Q13 in FIG. 5, from a relatively high resistance MFR4 in FIG. 4. The resistance is located off the printed circuit card in order to reduce the voltage level actually existing at the card terminals. Q13 is alternately cut off and saturated by the incoming signals and produces an output which is compatible with the counter input circuit. A strapping arrangement is provided to the counting chain input to incorporate an additional counter stage in the first chain which permits the input voltage to be taken directly from 60 Hz. signals in the event that the 30 Hz. Subcycle signal fails. This strapping arrangement envolves connecting terminal B to terminal C in FIG. 5 and disconnecting terminal C.

For an operable Subcycle generator with a 30 Hz. input, the output of Q13 is fed directly over terminals A and C to the input FF2 of the one-half second counting chain CC1. Counter flip-flop states in the Chain CC1, corresponding to counts of 1, 8, 11, 13, 14 and 15 are applied to a counter step decoder composed, in a preferred embodiment, of a plurality of AND-gates G22, G23, G24, G25, G26, and G27. The outputs of these gates are used to obtain various timed sequence pulses necessary for tone supply operation.

Assume that a count of "12" in a half-second period, which represents the first half of a 1-second repetitive cycle, has been reached. The occurrence of the next 30 Hz. pulse, "13," causes that state to be decoded in the counter step decoder CSD over an output which immediately causes the state of a flip-flop, designated as the Counting Chain Skip Control CCS to be set such that the output applied over the Common Counter Reset Bus 20 goes to 0. This causes all of the flip-flops of the first counting chain CC1 to be reset instantaneously to the states conforming to count "14," thereby eliminating the period of time which would have been occupied by the natural count of "13." Count "14" is then decoded in the CSD and, at its inception, causes the flip-flop, of CCS to revert to its initial state. This produces a 1 on the Reset Bus, 20, thereby permitting the counter to continue its function properly. The first half-second period, which is now only 15 counts, then repeats for as long as the 30 Hz. input exists. It is possible to produce count cycles of 10 and 13 pulses, as well, to accommodate clock frequencies of 20 and 25(26) Hz. as well as those of double those frequencies if the Z-counter stage is used. A 20 Hz. input is a requirement for those installations using that frequency for ringing voltage. Total counts of 10 or 13 are obtained by strapping the outputs of selected gates of CSD at terminals D, E and F.

The second counting chain (CC2, the 4-second counting chain shown in FIG. 6) receives the output from the first, over terminals 41—41′ exactly as in a normal counter, with the exception of the fact that the timing period is slightly shortened over that which would be expected of a straightforward 30 Hz. clock source. This permits the generation of nearly exact 1-second timing interval multiples.

As the clock pulses continue, the count progresses to the second repetition of the 15-count, one-half second, cycle. This period for convenience is designated as 2-"15" and the three flip-flops FF6, FF7 and FF8 in the 4-second counting chain CC2 are respectively cycled from their sequential outputs. The outputs of these flip-flops (from FF7 and FF8) are decoded and produce sequential ground output signals from AND-gates G43, G46, G48 and G49 in the Bay Distribution decoder, provided that enabling 1 signal is supplied on the Enable Bus at 22, derived from the RGS lead states (FIG. 8). The outputs of these gates are used to drive 30 Hz. Bay Distribution Relays in the desired sequence of one bay following the other in a 4-second cycle. The outputs of flip-flops FF7 and FF8 in CC2 are also decoded separately in a gate at 656 to produce a 1-second long ground output every 4 seconds. This pulse is eventually supplied for external use as well as being available for use for the internal chopper function. Because this signal is derived directly from the above-mentioned flip-flops, its output exists continuously, as compared to that of the Bay Distribution Decoder gates BD or G43, G46, G48, G49 which require an enabling signal.

The requirement of an enabling signal for the Bay Distribution ringing output commencement arises from the undesirability of operating the associated relays continuously during periods when no requirement for 30 Hz. Ring Voltage output exists. For small EPABX systems, only one RGS bus will be required but both will be needed as the system size increases. A ground input to an OR-gate G85, which receives signals from the RGS input busses, causes enabling signals, only, to be supplied to a relay cutoff control formed by G67, G68, G71 and G73. Operation cannot occur at this time. An AND-gate G15 (FIG. 5) also receives an input from G85 (FIG. 8) and may or may not supply an output, depending on the state of the G36–G42 flip-flop of the Reedac Driver Control at the time.

The occurrence of the first 2-"15" count after the initiation of the RGS signal is the activate signal which allows AND-gate G73 to apply a ground to the flip-flop, G67–G68. This flip-flop remains energized for the entire period between the first 2-"15" count after the initiation of the RGS signal and the first 2-"15" count occurring after the RGS signal terminates. OR-gate G67 output provides the Bay Distribution Decoder gate enable signal over the Enable Bus 22. This ensures that the Bay Distribution Relay operation cannot occur while the Reedac is on. Thus, none of the Bay Distribution Relays can initially be operated except in count 2-"15" of the timing cycle. Since at this part of the cycle, the Reedac itself would normally be cut off, even if RGS had previously been grounded, the random occurrence of the RGS signals cannot cause relay operation during the period when 30 Hz. voltage exists at their contacts. Filter networks shown as R and C connections in FIG. 8 are provided at both RGS inputs to G85 to prevent false triggering by transient signals.

The Reedac operating cycle, which permits conduction of the 30 Hz. voltage for about nine-tenths of every second, is controlled by the Reedac Driver Control flip-flop, G36–G42. At every 2-"14" count the flip-flop is set via G40 and G41, such that a 0 is applied from G36 to G15. This, in turn, causes cutoff of the Reedac drive relay, internal to the unit. The output of the internal SCR devices is cut off, subsequently, at the next zero-crossing of the 30 Hz. input voltage to the Reedac.

Because of the characteristic of the Reedac in not immediately cutting off when gate drive ceases, at least one full 30 Hz. pulse period must intervene between the cessation of the Reedac drive signal and the Distribution Relay operations. Therefore, the Reedac drive is terminated from the occurrence of the momentary 2-"13" pulse while the relays are switched at the transition between the 2-"15" and the 1-"0" pulses.

When the RGS input ground is removed, after call servicing is completed, the Bay Distribution Enabling Signal is removed. This is done through G58 and G71. The input to G58 is supplied from G36 which also drives the Reedac circuit. G36 normally produces a 1 during the Reedac ON period so that G58 has a 0 output. The G58 output would then be 1 when the Reedac is OFF. However, the output of G47 is tied to the output of G58 in a WIRED-OR circuit. Now, G47 receives the "15" count as its input. When the 1-"15" count occurs, the Reedac is ON and G58 is at ground, preventing the common output of G47 and G58 from rising to 1. However, at the 2-"15" count, both outputs are 1 and an input pulse is supplied to G71. Thus, if the RGS lead level had changed to 1 during the period preceding this 2-"15" count, G71 could not have produced an output until the 2-"15" count, occurred. At this time, G71 resets the flip-flop, G67–G68, removing the Bay Distribution Gate Enable bias, but only during the Reedac cutoff period.

EXTERNAL DC TIMING SIGNALS

A set of additional timing functions has been incorporated into the Tone Supply. These include the 120 IPS, the 60 IPS and the Wink Signals because of their inherent availability within the existing timing structure of the Tones Supply.

The 60 IPS and the Wink Signals are directly available. The former is picked off the output of the first timing chain CC1 (FIG. 6) which cycles every half-second. The second is derived directly from the Reedac control signal. Specifically, to provide the 60 IPS the output of FF6 is supplied to G69 (FIG. 8) to drive a standard Power Buffer (PB1) amplifier, G75. Unfortunately, the PB1 driver may not be used to drive any other IC DTL simultaneously. Consequently, a logically inverted signal from G69 must be provided, additionally, as the input to the PB1 rather than the complementary FF6 signal.

The Reedac control signal which produces the approximate 0.1 second cutoff period in the Reedac output, and is derived through the flip-flop, G36–G42, is applied to the power buffer amplifier or PB1, Q27, through G70—for the same reason as that for the 60 IPS output—to produce the Wink Signal.

To obtain the 120 IPS signal with a reasonable amount of timing accuracy, it is necessary to resort to a separate astable multivibrator which is synchronized at each second with the clock signals. It is not feasible to obtain an accurate ¼-second-timing pulse from the timing chain, unfortunately. Transistors Q19 and Q21 (FIG. 7) form an astable multivibrator whose period is approximately one-half second. The output from Q21, which has a nominal duration of one-quarter second, is supplied to the buffer amplifiers, Q22 and Q23. At each 1-second interval, as defined by the positive-going output of FF6, a pulse is generated from the Pulser P2, formed by G54 and G63, and supplied to the transistors forming the astable multivibrator. The emitters of the two transistors are normally above ground potential by the voltage drop existing continuously across 21D2. At each synchronizing pulse, the base drive to Q21 is reduced by the occurrence of the ground output pulse from G54—through 21D1—which tends to cut off Q21 by diverting part of the base current. At the same time, the collector of Q19 is brought near ground by virtue of the conduction of 19D1. Thus, capacitor 19C1 is partially discharged to bring it to a nearly uniform voltage at each FF6 repetition. This permits the synchronization of the astable timing action to the clock-pulsed timing chain.

OUTPUT ISOLATION

All the above outputs are supplied, as are the mixed tones, through Switchover Relay Contacts. These pass via RL2 shown in FIG. 12.

30 Hz. RING VOLTAGE CONTROL

The 30 Hz. Subcycle generator output (FIG. 4), which provides the timing signals to the timing chains, is also used for supplying the Ring Voltage output to the bays. The outputs are connected, through the Bay Distribution Relay contacts, directly to Bay Ring Busses such as RG1 and RG2 (RG3 and RG4, not shown), because of the higher power levels required. A −36-volt bias is placed in series with the actual Ring Voltage output winding of the Subcycle because of the dictates of the line circuits. This is supplied through a 10-ohm-protective resistor, MFR1, to the low end of the Subcycle output transformer winding. A filter capacitor, MFC1, also is provided at that point.

The nominal 90 v. RMS, 30 Hz. voltage, as indicated earlier, is applied to each bay of the overall system in strict rotation, one bay only being supplied with this voltage in any 1-second period. For each succeeding second, another of the bays in a fixed sequence receives the voltage until the cycle of 4 seconds duration supplying the maximum possible four bays, is completed. The process then starts anew. The same operating cycle is used for systems composed of any number of bays, up to four. However, equipment for the bays not supplied is not provided except for that necessary for the actually existing bay (s).

The output voltage for each of the bays is provided through isolating Form C contacts of the FRL1 relay. This relay is supplied to permit a Standby Tones Supply to be connected to the Ring Voltage busses in the event of failure in the original or Regular Supply. The relay is controlled from the Regular Supply only, on the SORD bus (FIG. 4) from Q34 (FIG. 12), and is in the energized condition while the Regular Supply actively supplies tones to the system. In the event of a failure in the Regular Supply, the relay becomes deenergized and the system-bus-connected pole contacts of the relay become connected to the Standby outputs.

The biased Ring Voltage obtained through the Subcycle winding is fed to the Reedac, operating under its control cycle, and thence it is supplied to the Common Ring Voltage Supply Bus from which the individual Bay Distribution Relays are supplied. A bleeder resistor, MFR2, is applied from the common bus to ground to minimize the Reedac cutoff leakage voltage. This voltage exists because of internally provided SCR compensation within the Reedac unit and would exist during the Bay Distribution Relay transition times. It is, therefore, swamped by MFR2 during the Reedac cutoff period. However, this reduces the total amount of power available for ringing subsets, which allows subset loading of one less than would have been the case without the bleeder.

The individual Bay Distribution Relays alternately connect the Common Ring Voltage Supply Bus to the FRL1 Switchover Relay contacts, as previously described. During the 3-second interval when the poles of the Bay Distribution Relays of a particular bay are not connected to the Common Ring Voltage Supply bus, the relay poles are connected to a common −36-volt bias bus which again is necessary because of the line circuit functional requirements.

REDUNDANT RING VOLTAGE PROVISION

A 30 Hz. Ring voltage source may be redundantly provided along with the Standby Supply in which case each of the Tone Supplies will have a separate Subcycle generator and associated Reedac. In the event, however, where only one Subcycle is available but a Standby Tones supply exists, the Reedac of the Subcycle output will be strapped to the inputs for both of the Regular and Standby supplies. In this case, the Reedac associated with the Standby unit is not supplied either. Instead, the Common Ring Voltage busses of both Regular and Standby are supplied from the same Reedac via a strap connecting the Regular Common Ring Bus to the Standby. These busses would be isolated if a Standby Subcycle Reedac Unit were available. This would be the case for a 100-line system where no space would be available for the second Reedac since, for uniformity, the Standby Reedac would have been mounted in the second of the 100-line bays. Another strap is required to supply Reedac drive voltage from the driver circuits in the event that no Standby Subcycle-Reedac exists.

ERROR DETECTION

Error Detection is performed on both Regular and Standby Tones Supplies whether in the active or inactive state, however, errors in 30 Hz. functions are not checked in the inactive circuit as this would produce interference with the signals being supplied by the active supply.

SAMPLED FAILURES

To prevent loss of function from a Tone Supply which is capable of disabling the EPABX from going unnoticed, Error Detectors are provided within each Tone Supply, both to warn of failure of function and cause switching to the Standby Tone supply, if one is available. Detection of loss of either one or both of the tones from the supervisory set of three mixed tones is available on a repeated sample basis. Similarly, loss of Ring Voltage to any of the bays, during the required 1-second active interval, the presence of Ring Voltage in more than 1 bay at any time, and the presence of Ring Voltage on the Common Ring Voltage Bus in the periods when the Reedac is supposed to be cut off is detected on a sampled basis. Sampling is done over a 4-second time interval. The occurrence of a failure causes a signal to be stored over this period. Failures occurring in two successive 4-second intervals, whether from the same cause or not, are regarded as sufficient reason to cause switching to the Standby Supply.

Failure of the 620 Hz. output or loss of the timing chain of 120 IPS output will cause the system to switch to Standby immediately upon detection. The 620 Hz. loss detection occurs within approximately 10 milliseconds of tone cessation. Detection of the loss of the other function requires approximately 8 seconds.

SUPERVISORY TONE LOSS DETECTION

The dual tones comprising each of the Dial, Ringback and Busy Signals are fed directly from their respective outputs to the Switchover Relay Contacts on the EPABX busses to low drain, rectifier-filter circuits. The action of the rectifier-filter circuits is to produce a signal representing the numerical difference in frequency between the two tones comprising the supervisory tone pair. If either of the tones forming the pair is lost, whether because of oscillator malfunction or subsequent circuit failure, the difference-frequency will disappear and the loss will be detected.

The filters (FIG. 9) are composed of operational amplifier RC networks, similar to those used for the oscillator tone production, although with less frequency accuracy. Two such stages of filtering are required for both the Busy and Dial Tones, while only a single stage is needed for Ringback. The input to the filter is taken from the power amplifier output and passed through a rectifier which produces sum-and-difference frequencies of the two tones composing the pair. The filter selects the difference-frequency and applies this to a Squaring Amplifier which provides square waves as an output at a repetition rate equal to the difference-frequency.

The operation of the filters is exemplified in the 140 Hz. filter of FIG. 9 which detects the Busy Tone failure where 140 Hz. is the difference between 620 and 480 Hz. comprising Busy Tone. The 140 Hz. filter LPF1 and its associated RC circuits at the noninverting input, acts as the first stage of a dual-cascaded-filter amplifier where rectification of the filter input takes place in diode A13D1. The second stage is formed by a second filter LPF4 in series with LPF1 and the similar associated circuits. Amplifier A18 provides a high gain output which produces sharp rise times of the filter-amplifier output. However, when the output level attempts to exceed the voltage of the Zener diode A18D1 in the inverting input amplifier feedback path, the gain is suddenly reduced as the Zener breaks down and the output level ceases to increase with increasing input voltage level. In effect, the amplifier thus acts as a limiter having a sharpening effect on the input signal fall and rise times.

The outputs from each of the three Difference-Frequency Detectors supply an individual input to one of three cascaded Shift-Register stages, FF9, FF10 and FF11 in FIG. 10. The Detector outputs act as clock pulses to each of the associated shift Register stages. In order for any of the Shift Register outputs to change at the clock pulses, the logic levels at its J and K input leads, which are the driving signal points, must be different at each clock pulse. If no change occurs at the JK input, no output change will occur when the clock pulse occurs. The three Register stages are connected in a manner such that "-true" output signals cannot simultaneously exist at all of the three JK inputs. This is done by crisscrossing the outputs of the last Register to inputs of the first Register while the others are fed directly. Thus, as long as clock pulses are being supplied to the three stages, repeated transitions will occur at the last stage about 40 per second after having been shifted through the first two stages. Since the clock pulses for each of the stages is dependent on the existence of the difference-frequency for each of the supervisory tones, failure of any one will cause termination of the cycling of the built-in transition of the Shift Registers and none may subsequently occur at the last stage.

Gate G10 detects the occurrence of the normal positive-going transition and produces a pulse each time that it occurs. The combination of G10–G12 represents a modification of a normal standard Pulser Circuit, here labeled P1. However, additional inputs are applied to G12, forming an additional AND gate, to permit its functioning as a Pulser only during the first half-second period when both Ringback tone and Busy tone occur simultaneously. When normal operation exists, the flip-flop, FF12, will be set at the beginning of each repetition of the cyclically reoccurring half-second period. The setting of this flip-flop removes the normally existing 1 from FF12 terminal 14 which is applied to one of the inputs of G7. During the second half-second of the period of simultaneous existence of Busy and Ringback tones, additional inputs are applied to G7 so that, at the 2-"14" count, all of the remaining inputs would be 1 simultaneously. Thus, had a failure in the tones occurred during the first half-second, the flip-flop would not have been set and its output would have remained 1. Therefore, at the 1-"14 " count, G7 would have produced a 0 output which would have been applied to the Error Detect Bus, and prime the Error Sampling Detector composed of FF13, FF14, and G78.

30 Hz. HERTZ ERROR DETECTORS

Additional inputs to the Error Sampling circuit are supplied from the 30 Hz. Error Detection circuits.

Buffer amplifiers, Q15, Q16, Q17 and Q18, provide synchronous pulses from the individual bay busses to gates G28, G29, G30, G31, G32 and G33, inclusive. If, during any 1-second period, more than one bay were to receive Ring Voltage, one of the gates, G28–G33, would be receiving signals simultaneously on both of its inputs. This occurs since both bays obtain their input from a single 30 Hz. source. Thus, an output would be provided to an OR-gate G37. G37, in turn, provides one input to G44 while the remaining G44 inputs are derived from signals which are one 1 during the 1-"14" count, when the Reedac is active. Thus, if two bays simultaneously are receiving 30 Hz. pulses at the 1-"14" count, G44 will produce a ground onto the Error Detect Bus and prime the Error Sampling Detector.

Also, circuitry is provided which checks for the occurrence of Ring Voltage during the period when any of the bays is expected to be receiving it. G34 samples the signals appearing on any of the Ring Busses and, after inversion by G38, applies the signal to one input of G45. The two other inputs to G45 become 1 during the 1-"14" count. The second of the G59 inputs is 1 during the Reedac ON period, as well. The third input to G59 becomes 1 for the 1-"15" count immediately following. The fourth input to G59 is provided from G57 and is normally 1, provided that the period being sampled by G34 corresponds to a bay which is actually in use. Had this latter arrangement not been made, lack of signal on a bus for which no output is required would also have caused an error signal although it would not have been merited. Therefore, only those inputs for which actual equipment bays are required are strapped to G57. Thus, as the Ring Voltage drive signal is applied to it, the output of G57 simultaneously becomes 1, thereby permitting a valid comparison of the presence of error.

An additional circuit concerned with the detection of errors in the 30 Hz. system is that which monitors the presence of signal on the Common Ring Voltage Bus during the period when the Reedac is presumed to be cut off. The buffer amplifier, Q35, is connected to the Common Ring Voltage Bus and produces 30 per second pulse outputs as long as a signal exists on the bus. When the Reedac is cut off at the 2-"14" count, the output of Q35 may or may not persist for an additional half-count. Q35 output provides one of the inputs to G60. The other G60 inputs are 1 when the Reedac is cut off and during the 2-"15" count. If during this 2-"15" count, the Common Ring Voltage output bus fails to lose signal, an output will be produced by G60 which will then provide an error input to the Error Sampling Detector.

The Error Sampling Detector is composed of a Shift Register which consists of two stages of JK flip-flop circuits and an AND gate. Both stages are driven from a common clock signal which is the output of FF8 over terminal C17 from FIG. 6. A steady 0 signal is provided onto the J-lead of the first stage which normally produces a 0 at the "true" output of the Shift Register stage while the input to the other is simply the cascaded output of the first. If at any time, the input to pin 4 of the Shift Register—which is the asynchronous input and may override the state of the JK inputs—goes to ground, a master-slave flip-flop pair in this device becomes set so that, at the occurrence of the following clock pulse, the "true" output becomes 1. This output is applied to the corresponding input of the AND-gate G68.

Prior to the occurrence of a clock pulse following an isolated error, it may be presumed that no ground has been applied recently to the Error Detect Bus, so that the state of the second Shift Register stage is such that its "true" output remains 0. Now, if the following clock pulse occurrence is simultaneous with a new error signal existing on the Error Detect Bus, such that the error bus has again become 0, the first Shift Register stage flip-flop master flip-flop becomes set to produce a 1 at the "true" output. However, at this time, the second Shift Register stage adopts the state of the first stage existing prior to the clock pulse while the first stage retains the error input just previously supplied. Since, now, both of the Shift Register stages produce 1 outputs, G78 becomes activated and applies a 0 onto the Alarm Input Bus (FIG. 12), via additional circuitry.

The effect of a 0 occurring for even a few milliseconds on the Alarm Input Bus is to energize the Switchover Relay in the Standby circuit while deenergizing that of the Regular. The action of the former is to perpetuate the error on the Regular, by applying a direct ground onto this bus so that it is not possible to return to the Regular Tone Supply without an overt act, such as depressing a reset button. This prevents "hunting" between Regular and Standby supplies due to noise-induced failures.

UNSAMPLED FAILURES

620 Hz. Failure

The 620 Hz. Detector, Q24, is normally maintained cut off so long as 620 Hz. is being supplied by the oscillator (FIG. 1) onto its output bus at 7. The effect of the presence of 620 Hz. is to produce a cutoff bias to the base of Q24 by means of the rectifier, 24D1, and the integrator, 24C1. If the 620 Hz. voltage should be lost for a period long enough for 24C1 to lose its negative bias, Q24 will start to conduct and shortly thereafter cause switchover to the Standby circuit. Discharge time for 24C1 is of the order of 10 cycles of the 620 Hz. input. If the signal loss persists long enough, about 20 milliseconds, the Standby Relay through contact RL2–5 will provide a latching voltage onto the Regular TLA bus so that switchover will become permanent.

TIMING CHAIN AND 120 IPS FAILURE

The final connection to the Alarm Input Bus is derived from the detectors monitoring the activity of the 120 IPS generator and the activity of the complete timing chain, FF2 to FF8 (FIGS. 5, 6, 7). Each of these output circuits is provided with a Pulser which provides an output 0 to alternate sides of the flip-flop, G65–G66. The input to G65, which is derived from the 120 IPS circuit, occurs each half-second and sets the flip-flop so that the G65 output goes to 1. After the first of the pulses which does change the state of G65, no further change will occur with repeated input pulses from G62. At the end of each 4-second interval, however, the G64 output which represents the output from FF8 changes to 0. This causes G65 to revert to a 0. At the very next output from G62, however, G65 again becomes 1. Thus, a pulse occurs from G65 each 4 seconds.

The G65 pulse is inverted in G72 and capacitively coupled to the base of Q25 in the timing chain failure detector. Now, because of the capacitive coupling via 24C2, only a change in state of G72 can produce a pulse to Q25. Therefore, since changes of state in G65 can occur only if the input to both halves of the flip-flop, G65–G66, occurs in sequence, Q25 will respond to the failure of either the 120 IPS signal or loss of the overall count by not receiving a repeated pulse, each 4 seconds.

The output of Q25 drives Q33. Q33 has the function of producing a maintaining signal to the standard timer, TM–8, each 4 seconds. As long as the periodic 4-second pulses are received, the TM–8 output will remain 1 since its timing capacitor repeatedly becomes recharged by the pulses. If, however, a period of more than 8 seconds goes by without a maintaining pulse occurrence, the output of TM–8 will drop to 0 to provide an alarm signal to the Alarm Input Bus, 20.

SWITCHOVER AND ALARM CIRCUIT

A ground signal appearing on the Regular Alarm Input Bus when no Standby exists will remain for as long a period as the error persists. When a Standby circuit exists, the error is made permanent by action of the Standby Supply activation. The effect of this ground on the Alarm Input Bus is to cause 1 outputs to occur from G81, G82, and G84. G81 drives G83 which then lights an Alarm Lamp mounted directly on the printed circuit card. At the same time, G83 removes the input saturation voltage supplied via a connector mounted jumper on the Regular Supply to maintain Q34 saturated and energize the switchover Relays, RL1, RL2 and FRL1. These relays become deenergized only if a Standby exists and removes the outputs of the Regular Tone supply from the various output busses to which they are normally fed. Relay deenergization does not occur if no Standby exists.

G82 applies alarm signals to the major and minor alarm indicator drivers in the Attendant Console and elsewhere. The output of G86 drives the Minor Alarm Bus directly. The output of G82, which is fed to G89, provides a priming input to the Major Alarm Bus. However, a major alarm will not be indicated unless a simultaneous failure signal occurs from the Standby Supply whose corresponding G82 output provides the other input to the Regular Supply G89 gate. If a Standby Tone Supply is not provided, a ground on the Alarm Input Bus cannot cause deenergization of the Regular relay since two input paths to Q34 exist. One of these is connected to the external RCH terminal and is sufficiently capable of driving the transistor by itself. The other is provided by the Regular Supply driver. If a Standby circuit is available, the RCH terminal of the Regular is grounded by the Standby TRF connection so that control of switchover is vested in the Regular circuit. When no Standby exists, loss of regular circuit drive is overcome by that existing on the RCH lead, which now no longer is grounded by the Standby TRF. Also, without the Standby, the Major Alarm Input lead to G89 normally carries a 1 so that, in the event that the Regular circuit fails, the Major Alarm signal is given along with the MINOR.

When a Standby Tones Supply is provided, at the same time that the Regular relays become deenergized, an output occurs from G84 which ties directly to the base of Q34 of the Standby circuit so that its relays RL1 and RL2 become energized. No connection is made to FRL1 for the Standby circuit, however. Activation of the Standby Relays causes a ground signal to be supplied onto the externally connected TLA bus of the Regular Tone Supply. The occurrence of this ground signal produces a ground form the Regular G79 since its output, in the absence of a routining signal, is 1. The TLA input is supplied to G80 through a discrete diode because of the method of signal application required in the Standby circuit. The TLA bus is connected to the output of G83 where the voltage in the 1 state is +18 volts which exceeds the breakdown voltage of the internal diode of the normal IC gates.

As soon as G79 output drops to ground, the Regular Relay drive circuit becomes latched up so that the input to G81, which removes the drive to the Regular relay cannot be restored and, at the same time, the drive to the Standby relay remains energized in an elaborate type of flip-flop arrangement. Another input to G80 is provided from a routining circuit which deliberately produces an alarm indication on the Alarm Input Bus to check the condition of the Switchover circuit. The alarm state under this condition is removed by the use of a reset key. This causes the output from G79, being held at 0 because of the TLA input, to revert to 1 as its other input goes to 0, thereby unlatching all the switchover circuitry.

In order to prevent the action of the RGS lead from producing Ring Voltage circuit operation in the inactive circuit of a redundant Tone Supply system, RL2–6 of either circuit is applied to the output of the opposite number Tone Supply gate, G85, via a filter network. The active Tones Supply thus places a ground on the G85 output of the inactive one so that no enabling signal may be applied to the Bay Distribution gate Enabling Bus. Thus, the operation of the 30 Hz. circuit is prevented when the particular circuit is inactive.

An additional indication is provided which does not come under the classification of an alarm. This is given if, in a system which normally is provided with a redundant set of Tones Supplies, one of the redundant supplies is removed from its socket, for reasons of repair or otherwise. In this even a jumper wire, connected on the printed circuit card between two connector terminals, becomes opened and breaks a circuit which then causes blinking of a lamp mounted on the Bay 1 cabinet. This lamp is the normal failure lamp on Bay 1. Another lamp on Bay 1 is an indicator of blower failure, when continuously illuminated. Both Tones Supply cards and all System Allotter cards are placed in this series of jumper wires and removal of any one will cause the indication described above.

An additional Alarm lamp is provided for that portion of the Tones Supply circuit which appears on a supplementary Tones Supply card and which is involved with the 30 Hz. and dual-tone failure detection. Because of space limitations, these circuits for both the Regular and Standby units are assembled onto a single supplementary card in addition to the Main card used for the bulk of the circuits.

The output of the Error Sampling Shift Register is not directly connected to the Alarm Input Bus, in order to permit the detection of an error exclusive to the 30 Hz. Error Detection circuit as opposed to the Main card units. The AND gate monitoring the Error Sampling Shift Register stage states feeds an inverter as well as an input to G80 on the Main card. The inverter output is used to drive a PB3 Buffer amplifier, G91, which handles the Alarm lamp.

When a failure in the 30 Hz. circuits occurs, G78 output goes to 0 lighting the lamp and applying the 0 to G80 as well. G80 produces a 1 to G79 whose other input is normally 1. G79 output going to 0 energizes the Alarm Input Bus to cause Switchover and main card Alarm lamp illumination. Both the Main card and Supplementary Card lamps are lit if the Supplementary card has a failure. However, only the Main card lamp lights if the failure occurs on the Main card circuitry.

While the principles of the invention have been described above in connection with specific apparatus and applications, it is to be understood that this description is made only by way of example and not as a limitation on the scope of the invention.

We claim:

1. Circuits for providing signals of use in controlling an electronic PABX and for checking said signals comprising
a source of primary signals,
means for processing said primary signals to provide secondary signals,
means for receiving said secondary signals and for providing an output signal in response to the detection of the presence of the secondary signals,
said means for receiving said secondary signals including means for providing an error signal in response to a change in the output signal caused by failure of one of said secondary signals, and
means responsive to the error signal to indicate loss of a secondary signal.

2. Circuits as claimed in claim 1, in which
the means for receiving said secondary signals includes a shift register.

3. Circuits as claimed in claim 1, in which
the source of primary signals includes an oscillator,
the means for processing said primary signals includes a filter circuit, and
said means for receiving said secondary signals includes a shift register.

4. Circuits as claimed in claim 1, in which
the source of primary signals includes a subcycle generator,
the means for processing said primary signals includes a counting chain, and
said means for receiving said secondary signals includes a pulser.

5. Circuits as claimed in claim 1, in which
the means for processing said primary signals includes a counting chain, and
the counting chain is formed in two parts, including a half-second counting chain and a 4-second counting chain.

6. Circuits as claimed in claim 1, in which
the means for processing said primary signals includes a counting chain,
the counting chain is formed in two parts, including a half-second counting chain and a 4-second counting chain, and
the means for providing an error signal include a decoder coupled to one of the parts of the counting chain to produce a coded output representing the error signal.

7. Circuits as claimed in claim 5, in which
a bay distribution decoder is coupled to the 4-second counting chain to provide four 1-second signals in succession over parallel circuits, and
said 1-second signals are used to enable switching bays to operate in sequence.

8. Circuits as claimed in claim 1, in which
the source of primary signals includes an oscillator, and
the oscillator employs maximum level limiting to improve amplitude stability,
said maximum level limiting being provided by a circuit in a feedback path composed of a series resistor and a shunting pair of zener diodes.

9. Circuits as claimed in claim 1, in which
the means for processing said primary signals to provide secondary signals includes a push-pull amplifier formed by series connected transistors of opposite conduction type, and
means are provided to overcome the threshold conduction level of the transistors,
said means including two forward biased diodes placed across the base-emitter junctions of the series-connected transistors.

* * * * *